US008326508B2

(12) United States Patent
Yamada

(10) Patent No.: US 8,326,508 B2
(45) Date of Patent: Dec. 4, 2012

(54) CONTROL DEVICE AND CONTROL METHOD FOR AUTOMATIC TRANSMISSION

(75) Inventor: Naohiro Yamada, Atsugi (JP)

(73) Assignee: Jatco Ltd, Fuji-shi (JP)

(*) Notice: Subject to any disclaimer, the term of this patent is extended or adjusted under 35 U.S.C. 154(b) by 302 days.

(21) Appl. No.: 12/850,315

(22) Filed: Aug. 4, 2010

(65) Prior Publication Data

US 2011/0054755 A1 Mar. 3, 2011

(30) Foreign Application Priority Data

Sep. 2, 2009 (JP) ................................. 2009-202329

(51) Int. Cl.
G06F 17/00 (2006.01)
F16H 57/10 (2006.01)
(52) U.S. Cl. ......................................................... 701/78
(58) Field of Classification Search .............. 701/67–68, 701/78–80, 87–88, 90; 477/70–71, 92–95, 477/181; 475/43, 125, 194–195, 257; 192/54.1, 192/223
See application file for complete search history.

(56) References Cited

U.S. PATENT DOCUMENTS

| 4,942,530 | A | * | 7/1990 | Boda et al. ........................ 701/66 |
| 5,613,921 | A | * | 3/1997 | Sugiyama et al. ............. 477/125 |
| 5,679,094 | A | | 10/1997 | Nakamura et al. |
| 6,022,288 | A | * | 2/2000 | Cho ................................ 475/276 |
| 6,152,852 | A | | 11/2000 | Sakakibara et al. |
| 6,343,528 | B1 | * | 2/2002 | Tamamoto et al. ........... 74/733.1 |
| 6,843,754 | B2 | * | 1/2005 | Mori et al. ....................... 477/92 |

| 2001/0020206 | A1 | | 9/2001 | Nishimura |
| 2002/0005077 | A1 | | 1/2002 | Ozaki et al. |
| 2002/0116110 | A1 | | 8/2002 | Takatori et al. |
| 2003/0064849 | A1 | | 4/2003 | Saitou et al. |
| 2003/0119631 | A1 | | 6/2003 | Yoneyama |
| 2004/0230360 | A1 | | 11/2004 | Matsumura et al. |
| 2005/0096182 | A1 | * | 5/2005 | Ohta .............................. 477/181 |
| 2005/0222737 | A1 | | 10/2005 | Imamura et al. |
| 2006/0094555 | A1 | | 5/2006 | Long et al. |
| 2006/0094564 | A1 | | 5/2006 | Ilda et al. |

(Continued)

FOREIGN PATENT DOCUMENTS

JP 08-028678 A 2/1996

(Continued)

OTHER PUBLICATIONS

U.S. Appl. No. 12/870,173, filed Aug. 27, 2010, Yamada.

(Continued)

Primary Examiner — Mary Cheung
(74) Attorney, Agent, or Firm — Foley & Lardner LLP

(57) ABSTRACT

A control device for an automatic transmission includes a determining unit determines that a friction element is to be set in an engaged condition in case a vehicle speed is equal to or higher than a determination reference and determining that the friction element is to be set in a disengaged condition in case the vehicle speed is lower than the determination reference, and a engagement control unit that performs control to engage or disengage the friction element on the basis of a determination result of the determining unit, wherein the engagement control unit comprises a prohibiting unit that prohibits setting of the friction element in the engaged condition until a predetermined condition is established, regardless of the determination result, after the friction element has been modified from the engaged condition to the disengaged condition.

18 Claims, 9 Drawing Sheets

U.S. PATENT DOCUMENTS

| | | |
|---|---|---|
| 2007/0232443 A1 | 10/2007 | Kimura et al. |
| 2008/0076632 A1 | 3/2008 | Watanabe et al. |
| 2008/0153636 A1 | 6/2008 | Inoue et al. |
| 2008/0153655 A1 | 6/2008 | Kawaguchi et al. |
| 2008/0167155 A1 | 7/2008 | Kawaguchi et al. |
| 2008/0227580 A1 | 9/2008 | Kawaguchi et al. |
| 2008/0242501 A1 | 10/2008 | Tsunekawa |
| 2008/0269013 A1 | 10/2008 | Minaki et al. |
| 2009/0312924 A1 | 12/2009 | Moriya et al. |
| 2009/0319141 A1* | 12/2009 | Suzuki et al. .......... 701/58 |
| 2010/0105521 A1 | 4/2010 | Kondo et al. |
| 2011/0054751 A1 | 3/2011 | Yamada |

FOREIGN PATENT DOCUMENTS

| | | |
|---|---|---|
| JP | 11-132326 A | 5/1999 |
| JP | 2003-269603 A | 9/2003 |
| JP | 2004-138192 A | 5/2004 |
| JP | 2009-030775 A | 2/2009 |
| JP | 2009-092186 A | 4/2009 |

OTHER PUBLICATIONS

F. Kuculay et al., "Intelligente Steuerung von Automatikgetrieben durch den Einsatz der Elektronik", No. 4, Apr. 1994, pp. 228-235.

N. Narumi et al., "Trends of Powertrain Control", Society of Automotive Engineers, Inc. Oct. 1990, pp. 313-323.

N. Yamada, U.S. PTO Office Action, U.S. Appl. No. 12/870,173, dated Apr. 12, 2012, 13 pages.

* cited by examiner

|      | B1<br>Fr/B | C1<br>I/C | C2<br>D/C | C3<br>H&LR/C | B2<br>LOW/B | B3<br>2346/B | B4<br>R/B | F1 | F2 |
|------|------------|-----------|-----------|--------------|-------------|--------------|-----------|----|----|
| 1st  | (◯)        |           |           | (◯)          | ◯           |              |           | ◯  | ◯  |
| 2nd  |            |           |           | (◯)          | ◯           | ◯            |           |    | ◯  |
| 3rd  |            |           | ◯         |              | ◯           | ◯            |           |    |    |
| 4th  |            |           | ◯         | ◯            |             | ◯            |           |    |    |
| 5th  |            | ◯         | ◯         | ◯            |             |              |           |    |    |
| 6th  |            | ◯         |           | ◯            |             | ◯            |           |    |    |
| 7th  | ◯          | ◯         |           | ◯            |             |              |           | ◯  |    |
| Rev. | ◯          |           |           | ◯            |             |              | ◯         |    |    |

*FIG. 3*

|  | 1t | 2nd | 3rd | 4th | 5th | 6th | 7th | Rev |
|---|---|---|---|---|---|---|---|---|
| SOL1 | ON(O) | ON(O) | ON(O) | OFF(×) | OFF(×) | OFF(×) | OFF(×) | OFF(×) |
| SOL2 | ON(×) | ON(×) | ON(×) | ON(×) | OFF(O) | OFF(O) | OFF(O) | ON(×) |
| SOL3 | ON(O) | OFF(×) | OFF(×) | OFF(×) | OFF(×) | OFF(×) | ON(O) | ON(O) |
| SOL4 | OFF(O) | OFF(O) | ON(×) | OFF(O) | OFF(O) | OFF(O) | OFF(O) | OFF(O) |
| SOL5 | OFF(×) | ON(O) | ON(O) | ON(O) | OFF(×) | ON(O) | OFF(×) | OFF(×) |
| SOL6 | ON(×) | ON(×) | OFF(O) | OFF(O) | OFF(O) | ON(×) | ON(×) | ON(×) |
| SOL7 | ON(O) | ON(O) | ON(O) | OFF(×) | OFF(×) | OFF(×) | OFF(×) | ON→OFF |

FIG. 4

CONTROL DEVICE AND CONTROL METHOD FOR AUTOMATIC TRANSMISSION

TECHNICAL FIELD OF THE INVENTION

This invention relates to a control device and method for an automatic transmission which controls an engagement condition of a lockup clutch in a torque converter.

BACKGROUND OF THE INVENTION

A torque converter installed in a transmission of a vehicle is provided with a lockup clutch as a friction element. By setting the lockup clutch in an engaged condition, a deviation between input/output rotation speeds of the torque converter is suppressed, leading to an improvement in the fuel efficiency of an engine.

JP8-28678A discloses a lockup control device for a fluid coupling that suppresses and prevents hunting by setting a determination value for switching the fluid coupling from a converter condition to a lockup condition and a determination value for switching the fluid coupling from the lockup condition to the converter condition on either side of a hysteresis region has been disclosed as this type of torque converter.

SUMMARY OF THE INVENTION

In the conventional technique described above, hunting occurring during engagement/disengagement of a lockup clutch is prevented by setting hysteresis between the determination value (the vehicle speed, for example) for engaging the lockup clutch and the determination value for disengaging the lockup clutch.

Normally, a lower limit value (second vehicle speed) of the determination value at which it is decided to disengage the lockup clutch is set in order to prevent stalling due to a reduction in an engine rotation speed and secure a minimum volume of discharge pressure from an oil pump. Hence, to prevent hunting, a first vehicle speed for engaging the lockup clutch is set higher than the second vehicle speed for disengaging the lockup clutch, and the hysteresis is set between these vehicle speeds.

By setting the hysteresis in this manner, an engagement region of the lockup clutch narrows in proportion to the hysteresis.

On the other hand, if the hysteresis is eliminated and the determination value for engaging the lockup clutch is set to be identical to the determination value for disengaging the lockup clutch, the lockup clutch engagement region increases, leading to an improvement in fuel efficiency. However, when setting is performed in this manner, hunting cannot be suppressed.

Hence, there is a trade-off between improving the fuel efficiency by controlling the lockup clutch and suppressing hunting, and it is difficult to realize both.

This invention has been designed in consideration of this problem, and an object thereof is to provide a control device for an automatic transmission with which both an improvement in fuel efficiency and suppression of hunting can be realized.

According to an aspect of this invention, a control device for an automatic transmission having a torque converter, in which a target gear position is set on the basis of a vehicle speed and an engine load includes: a vehicle speed detecting unit that detects the vehicle speed; a storing unit that stores a determination reference used to determine whether to set a friction element for locking up the torque converter in an engaged condition or a disengaged condition; a determining unit that determines that the friction element is to be set in the engaged condition in case the vehicle speed is equal to or higher than the determination reference and determining that the friction element is to be set in the disengaged condition in case the vehicle speed is lower than the determination reference; and an engagement control unit performs control to engage or disengage the friction element on the basis of a determination result of the determining unit, wherein the engagement control unit comprise a prohibiting unit that prohibits setting of the friction element in the engaged condition until a predetermined condition is established, regardless of the determination result, after the friction element is controlled from the engaged condition to the disengaged condition.

According to another aspect of this invention, a control method for an automatic transmission having a torque converter, in which a target gear position is set on the basis of a vehicle speed and an engine load, includes: a detecting step for detecting the vehicle speed; a storing step for storing a determination reference used to determine whether to set a friction element for locking up the torque converter in an engaged condition or a disengaged condition; a determining step for determining that the friction element is to be set in the engaged condition in case the vehicle speed is equal to or higher than the determination reference and determining that the friction element is to be set in the disengaged condition in case the vehicle speed is lower than the determination reference; and an engagement control step for performing control to engage or disengage the friction element on the basis of a determination result of the determining step, wherein the engagement control step comprises a prohibiting step for prohibiting setting of the friction element in the engaged condition until a predetermined condition is established, regardless of the determination result, after the friction element is controlled from the engaged condition to the disengaged condition.

The details as well as other features and advantages of this invention are set forth in the remainder of the specification and are shown in the accompanying drawings.

BRIEF DESCRIPTION OF THE DRAWINGS

FIG. 3 is an illustrative view of an engagement operation table according to the first embodiment of this invention.

FIG. 4 is an illustrative view illustrating operation states of a solenoid valve according to the first embodiment of this invention.

DESCRIPTION OF THE PREFERRED EMBODIMENTS

A control device for an automatic transmission according to embodiments of this invention will be described below with reference to the figures.

First Embodiment

Figure 1:
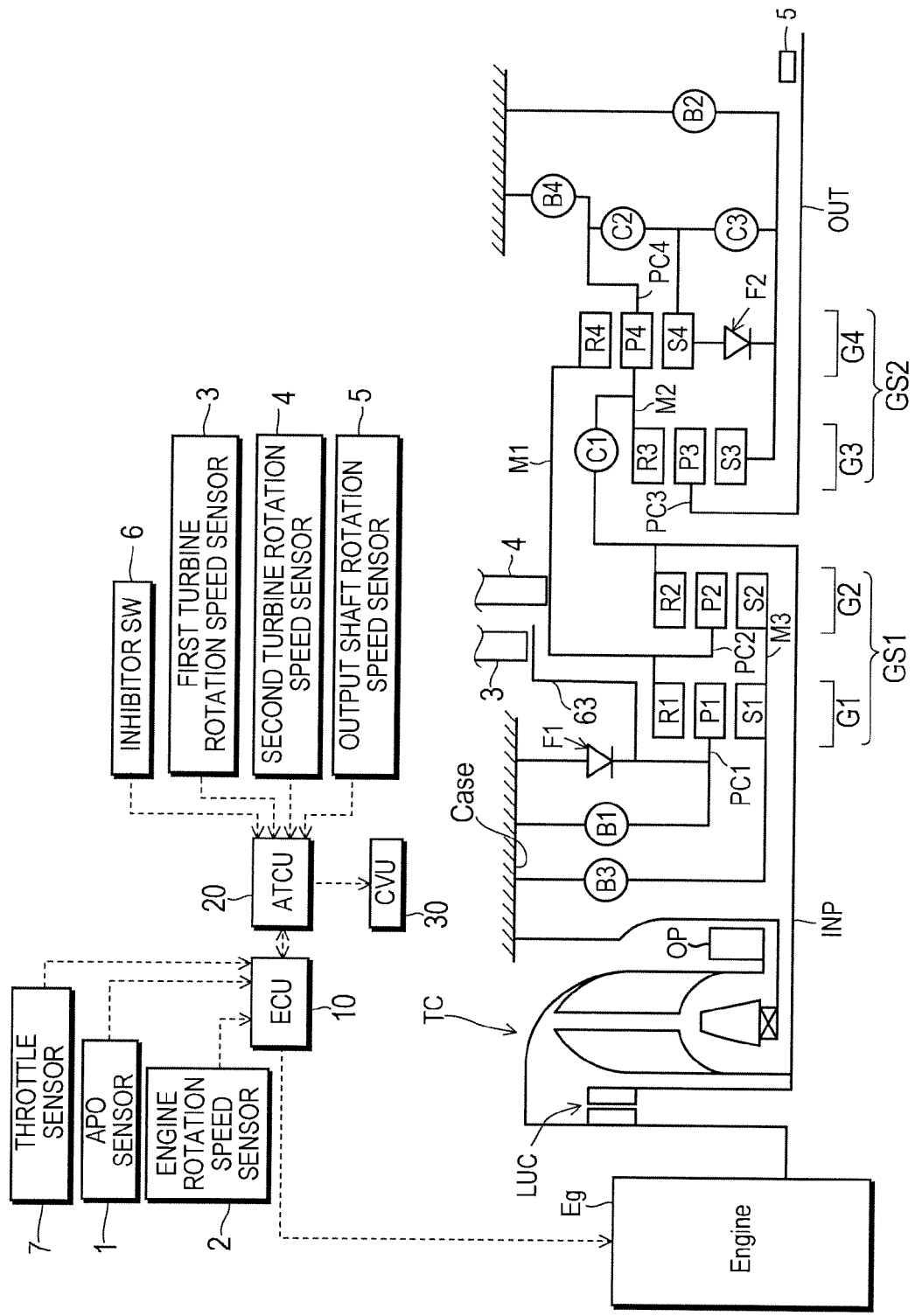
FIG. 1 is an illustrative view illustrating the constitution of an automatic transmission according to a first embodiment of this invention.

FIG. 1 is an illustrative view illustrating the constitution of an automatic transmission according to a first embodiment of this invention.

The automatic transmission according to this embodiment is an automobile transmission having seven forward gear positions and one reverse gear position, which is connected to an engine Eg of a vehicle via a torque converter TC including a lockup clutch LUC. Rotation output from the engine Eg is transmitted to a pump impeller and an oil pump OP of the torque converter TC, whereupon oil agitated by rotation of the pump impeller is transmitted to a turbine runner via a stator. As a result, an input shaft INP is driven.

The vehicle, not shown in the drawing, is further provided with an engine controller (ECU) 10 that controls a driving condition of the engine Eg, an automatic transmission controller (ATCU) 20 that controls a shift condition and so on of the automatic transmission, and a control valve unit (CVU) 30 that executes hydraulic control on a clutch, a brake, and so on based on output signals from the ATCU 20. The ECU 10 and the ATCU 20 are connected via a CAN communication line or the like so as to share sensor information and control information with each other through communication.

An accelerator opening sensor 1 that detects an accelerator pedal operation amount (accelerator pedal opening) APO generated by a driver, a throttle opening sensor 1a that detects a throttle opening TVO of the engine, and an engine rotation speed sensor 2 that detects an engine rotation speed are connected to the ECU 10. On the basis of the engine rotation speed and the accelerator pedal opening APO, the ECU 10 controls a fuel injection amount and the throttle opening, whereby the engine rotation speed and an engine torque are controlled.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of an output shaft OUT, and an inhibitor switch 6 that detects a shift lever operation condition generated by the driver, all of which will be described below, are connected to the ATCU 20. The shift lever includes, in addition to P, R, N and D positions, an engine brake range position in which an engine brake is operative and a normal forward travel range position in which the engine brake is inoperative.

The ATCU 20 includes a rotation speed calculation unit that calculates a rotation speed of the input shaft INP. During a normal operation, the ATCU 20 sets an optimum target gear position from a shift map of the seven forward speeds, to be described below, on the basis of a vehicle speed Vsp and either the throttle opening TVO or the accelerator pedal opening APO, and outputs a control command to the CVU 30 to realize the target gear position.

Further, the ATCU 20 performs control to set the lockup clutch LUC of the torque converter TC in an engaged condition or a disengaged condition and outputs a control command to the CVU 30.

Constitution of Automatic Transmission

Next, the constitution of the automatic transmission will be described.

Planetary gear mechanisms are disposed in an axial direction from the input shaft INP side to the output shaft OUT side in order of a first planetary gear set GS1 and a second planetary gear set GS2. Further, a plurality of clutches C1, C2, C3, a plurality of brakes B1, B2, B3, B4, and a plurality of one-way clutches F1, F2 are provided.

The first planetary gear set GS1 includes two planetary gears G1, G2. The first planetary gear G1 is a single pinion planetary gear comprising a first sun gear 51, a first ring gear R1, a first pinion P1 meshed to the two gears S1, R1, and a first carrier PC1 that supports the first pinion P1 rotationally.

The second planetary gear G2 is also a single pinion planetary gear and comprises a second sun gear S2, a second ring gear R2, a second pinion P2 meshed to the two gears S2, R2, and a second carrier PC2 that supports the second pinion P2 rotationally.

The second planetary gear set GS2 includes two planetary gears G3, G4. The third planetary gear G3 is a single pinion planetary gear comprising a third sun gear S3, a third ring gear R3, a third pinion P3 meshed to the two gears S3, R3, and a third carrier PC3 that supports the third pinion P3C rotationally.

The fourth planetary gear G4, similarly to the first to third gear sets, is a single pinion planetary gear comprising a fourth sun gear S4, a fourth ring gear R4, a fourth pinion P4 meshed to the two gears S4, R4, and a fourth carrier PC4 that supports the fourth pinion P4 rotationally.

The input shaft INP is connected to the second ring gear R2 such that a rotary driving force from the engine Eg is input into the second ring gear R2 via the torque converter TC and so on.

The output shaft OUT, on the other hand, is connected to the third carrier PC3 such that an output rotary driving force is transmitted to a drive wheel via a final gear, not shown in the drawing, and so on.

The first ring gear R1, second carrier PC2, and fourth ring gear R4 are connected integrally by a first connecting member M1. The third ring gear R3 and the fourth carrier PC4 are connected integrally by a second connecting member M2, and the second connecting member M2 is connected to the input shaft INP and the second ring gear R2 via the clutch C1.

The first sun gear S1 and the second sun gear S2 are connected integrally by a third connecting member M3.

Hence, in the first planetary gear set GS1, the first planetary gear G1 and second planetary gear G2 are connected by the first connecting member M1 and the third connecting member M3, and therefore the first planetary gear set GS1 is constituted by four rotary elements. In the second planetary gear set GS2, the third planetary gear G3 and fourth planetary gear G4 are connected by the second connecting member M2, and therefore the second planetary gear set GS2 is constituted by five rotary elements.

The first planetary gear set GS1 includes a torque input path for torque input into the second ring gear R2 from the input shaft INP, and the torque input into the first planetary gear set GS1 is output to the second planetary gear set GS2 from the first connecting member M1.

The second planetary gear set GS2 includes a torque input path for torque input into the second connecting member M2 from the input shaft INP and a torque input path for torque input into the fourth ring gear R4 from the first connecting member M1, and the torque input into the second planetary gear set GS2 is output to the output shaft OUT from the third carrier PC3.

Of the clutches C1 to C3, an input clutch C1 selectively connects and disconnects the input shaft INP and the second connecting member M2, while a direct clutch C2 selectively connects and disconnects the fourth sun gear S4 and the fourth carrier PC4.

An H&LR clutch C3 selectively connects and disconnects the third sun gear S3 and the fourth sun gear S4. A second one-way clutch F2 is disposed between the third sun gear S3 and the fourth sun gear S4. The second one-way clutch F2 permits relative rotation between the third sun gear S3 and the fourth sun gear S4 in only one direction and rotates integrally therewith in an opposite direction.

When the H&LR clutch C3 is disengaged and the rotation speed of the fourth sun gear S4 is larger than that of the third sun gear S3, the third sun gear S3 and the fourth sun gear S4 generate independent rotation speeds. Therefore, the third planetary gear G3 and fourth planetary gear G4 are connected via the second connecting member M2 such that the respective planetary gears realize independent gear ratios.

Of the brakes B1 to B4, a front brake B1 selectively halts rotation of the first carrier PC1. A first one-way clutch F1 is disposed parallel to the front brake B1.

A low brake B2 selectively halts rotation of the third sun gear S3. A 2346 brake B3 selectively halts rotation of the third connecting member M3 (the first sun gear S1 and second sun gear S2). A reverse brake B4 selectively halts rotation of the fourth carrier PC4.

Turbine Rotation Speed Calculation

The input shaft INP is connected to the second ring gear R2 while the first planetary gear G1 and second planetary gear G2 constitute the first planetary gear set GS1 to which two rotary elements are connected, and therefore the rotation speed calculation unit provided in the ATCU 20 detects the rotation speed of the input shaft INP through calculation using the two turbine rotation speed sensors 3, 4.

The second turbine rotation speed sensor 4 detects the rotation speed of the second carrier PC2, and the first turbine rotation speed sensor 3 detects the rotation speed of a sensor member 63 serving as a turbine sensor member connected to the first carrier PC1.

When the rotation speed of the first carrier PC1 is denoted by N (PC1), the rotation speed of the second carrier PC2 is denoted by N (PC2), the rotation speed of the second ring gear R2 is denoted by N (R2), a gear ratio between the second ring gear R2 and the second carrier PC2 (first ring gear R1) is denoted by 1, and a gear ratio between the first ring gear R1 (second carrier PC2) and the first carrier PC1 is denoted by β, the rotation speed N (R2) of the second ring gear R2 can be calculated using a following equation.

$$N(R2) = (1 + 1/\beta) \cdot N(PC2) - (1/\beta) \cdot N(PC1)$$

Hence, rotation speed of second ring gear R2 (input shaft INP)=turbine rotation speed can be determined.

Constitution of Control Valve Unit

Next, a hydraulic circuit of the CVU 30 will be described using FIG. 2.

The hydraulic circuit is provided with the oil pump OP, which serves as an oil pressure source driven by the engine Eg, a manual valve MV that operates in conjunction with a shift lever operation by the driver to switch an oil passage along which a line pressure PL is supplied, and a pilot valve PV that reduces the line pressure to a predetermined fixed pressure.

The hydraulic circuit is also provided with a first pressure regulating valve CV1 that regulates an engagement pressure of the low brake B2, a second pressure regulating valve CV2 that regulates an engagement pressure of the input clutch C1, a third pressure regulating valve CV3 that regulates an engagement pressure of the front brake B1, a fourth pressure regulating valve CV4 that regulates an engagement pressure of the H&LR clutch C3, a fifth pressure regulating valve CV5 that regulates an engagement pressure of the 2346 brake B3, and a sixth pressure regulating valve CV6 that regulates an engagement pressure of the direct clutch C2.

The hydraulic circuit is further provided with a first switch valve SV1 that switches one of respective oil supply passages 150a, 150b of the low brake B2 and the input clutch C1 to a communicative condition, a second switch valve SV2 that switches one of respective oil supply passages for supplying a D range pressure and an R range pressure to the direct clutch C2 to a communicative condition, a third switch valve SV3 that switches an oil pressure supplied to the reverse brake B4 between an oil pressure supplied from the sixth pressure regulating valve CV6 and an oil pressure supplied from the R range pressure, and a fourth switch valve SV4 that switches an oil pressure output by the sixth pressure regulating valve CV6 between an oil passage 123 and an oil passage 122.

The hydraulic circuit is further provided with a first solenoid valve SO1 that outputs a pressure control signal to the first pressure regulating valve CV1, a second solenoid valve SOL2 that outputs a pressure control signal to the second pressure regulating valve CV2, a third solenoid valve SOL3 that outputs a pressure control signal to the third pressure regulating valve CV3, a fourth solenoid valve SOL4 that outputs a pressure control signal to the fourth pressure regulating valve CV4, a fifth solenoid valve SOL5 that outputs a pressure control signal to the fifth pressure regulating valve CV5, a sixth solenoid valve SOL6 that outputs a pressure control signal to the sixth pressure regulating valve CV6, and a seventh solenoid valve SOL7 that outputs a switch signal to the first switch valve SV1 and the third switch valve SV3, on the basis of control signals from the automatic transmission control unit 20.

The solenoid valves SOL2, SOL5, SOL6 are respectively constituted by three-way proportioning solenoid valves having three ports, wherein a pilot pressure to be described below is led to a first port, a second port is connected to a drain oil passage, and a third port is connected to a pressure receiving portion of either a pressure regulating valve or a switch valve. The solenoid valves SOL1, SOL3, SOL4 are respectively constituted by two-way proportioning solenoid valves having two ports, and the solenoid valve SOL7 is a three-way ON/OFF solenoid valve having three ports.

The first solenoid valve SOL1, third solenoid valve SOL3, and seventh solenoid valve SOL7 are normally closed (closed when not energized) solenoid valves. The second solenoid valve SOL2, fourth solenoid valve SOL4, fifth solenoid valve SOL5, and sixth solenoid valve SOLE, on the other hand, are normally open (open when not energized) solenoid valves.

Oil Passage Configuration

Pressure discharged by the oil pump OP when driven by the engine is regulated to a line pressure and then supplied to an oil passage 101 and an oil passage 102. An oil passage 101a connected to the manual valve MV, which is activated in conjunction with a shift lever operation by the driver, an oil passage 101b that supplies a source pressure of the engagement pressure of the front brake B1, and an oil passage 101c that supplies a source pressure of the engagement pressure of the H&LR clutch C3 are connected to the oil passage 101.

An oil passage 105 and an oil passage 106 that supplies the R range pressure, which is selected during reverse travel, are connected to the manual valve MV, and the manual valve MV switches between the oil passage 105 and the oil passage 106 in accordance with the shift lever operation.

An oil passage 105a that supplies a source pressure of the engagement pressure of the low brake B2, an oil passage 105b that supplies a source pressure of the engagement pressure of the input clutch C1, an oil passage 105c that supplies a source pressure of the engagement pressure of the 2346 brake B3, an oil passage 105d that supplies a source pressure of the engagement pressure of the direct clutch C2, and an oil passage 105e that supplies a switch pressure of the second switch valve SV2, to be described below, are connected to the oil passage 105.

An oil passage 106a that supplies the switch pressure of the second switch valve SV2, an oil passage 106b that supplies the source pressure of the engagement pressure of the direct clutch C2, and an oil passage 106c that supplies the engagement pressure of the reverse brake B4 are connected to the oil passage 106.

An oil passage 103 that supplies the pilot pressure via the pilot valve PV is connected to the oil passage 102. The oil passage 103 is provided with an oil passage 103a that supplies the pilot pressure to the first solenoid valve SOL1, an oil passage 103b that supplies the pilot pressure to the second solenoid valve SOL2, an oil passage 103c that supplies the pilot pressure to the third solenoid valve SOL3, an oil passage 103d that supplies the pilot pressure to the fourth solenoid valve SOL4, an oil passage 103e that supplies the pilot pressure to the fifth solenoid valve SOL5, an oil passage 103f that supplies the pilot pressure to the sixth solenoid valve SOLE, and an oil passage 103g that supplies the pilot pressure to the seventh solenoid valve SOL7.

By constituting the hydraulic circuit in this manner and controlling the respective solenoid valves, the clutches C1 to C3 and brakes B1 to B4 can be engaged and disengaged. The hydraulic circuit also includes a circuit for supplying oil pressure to a piston oil chamber 62 of the lockup clutch LUC.

As shown by an engagement operation table in FIG. 3, by combining engagement (marked by circles) and disengagement (unmarked) of the respective clutches C1 to C3 and brakes B1 to B4 appropriately, the respective gear positions of the seven forward speeds and the single reverse speed can be realized.

Shift Operations

Next, shift operations will be described. cl First Speed

In the first speed, different clutches and brakes are operated depending on whether the engine brake is operative (an engine brake range position has been selected) or inoperative (a normal forward travel range position has been selected). As shown by the (o) marks in FIG. 3, when the engine brake is operative, the first speed is obtained by engaging the front brake B1, the low brake B2, and the H&LR clutch C3. The first one-way clutch F1 provided parallel to the front brake B1 and the second one-way clutch F2 provided parallel to the H&LR clutch C3 also contribute to torque transmission. When the engine brake is inoperative, the front brake B1 and the H&LR clutch C3 are disengaged such that only the low brake B2 is engaged, and torque is transmitted by the first one-way clutch F1 and second one-way clutch F2.

In the first speed, the front brake B1 is engaged (engaged by the first one-way clutch F1 when the engine brake is inoperative), and therefore rotation input into the second ring gear R2 from the input shaft INP is reduced by the first planetary gear set GS1. This reduced rotation is output to the fourth ring gear R4 from the first connecting member M1. Further, the low brake B2 and the H&LR clutch C3 are engaged (engaged by the low brake B2 and the second one-way clutch F2 when the engine brake is inoperative), and therefore rotation input into the fourth ring gear R4 is reduced by the second planetary gear set and output from the third carrier PC3.

In the first speed, torque acts on the front brake B1 (or the first one-way clutch F1), the low brake 132, the H&LR clutch C3 (or the second one-way clutch F2), the first connecting member M1, the second connecting member M2, and the third connecting member M3. In other words, the first planetary gear set GS1 and second planetary gear set GS2 contribute to torque transmission.

At this time, as shown by a solenoid valve operation table in FIG. 4, engagement pressure is supplied to the desired clutches and brakes by switching the first to third solenoid valves SOL1 to SOL3 and the sixth and seventh solenoid valves SOLE, SOL7 ON and switching the other solenoid valves OFF.

Figure 2:
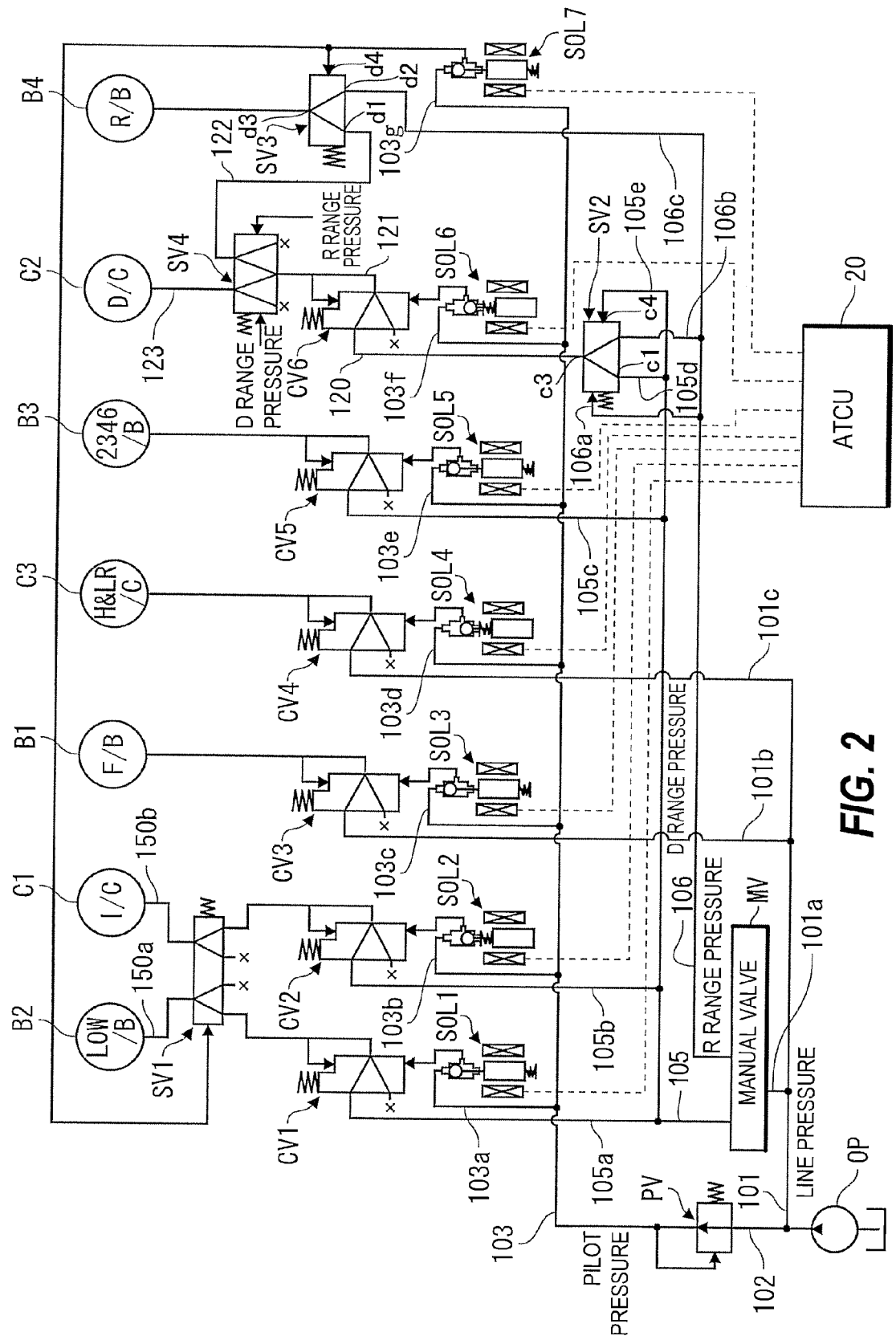
FIG. 2 is an illustrative view illustrating a hydraulic circuit of a control valve unit according to the first embodiment of this invention.

Further, since the seventh solenoid valve SOL7 is ON, the first switch valve SV1 moves to the left of FIG. 2 such that the first pressure regulating valve CV1 communicates with the low brake B2 and the input clutch C1 is connected to a drain (thus an interlocking condition is prevented). Furthermore, since the D range pressure is exerted on a fourth port c4, the second switch valve SV2 moves to the left in FIG. 2 such that a first port c1 communicates with a third port c3, and therefore the D range pressure acts on the sixth pressure regulating valve CV6. The sixth pressure regulating valve CV6 moves downward in FIG. 2, and therefore the D range pressure is not supplied to the direct clutch C2 and the fourth switch valve SV4.

It should be noted that the D range pressure causes the fourth switch valve SV4 to move to the right of FIG. 2 such that the oil passage 121 communicates with the oil passage 123, but this bears no relation to the engagement operation. Further, a signal pressure is supplied to a port d4 from the seventh solenoid valve SOL7, and therefore the third switch valve SV3 moves to the left in FIG. 2 such that a first port d1 communicates with a third port d3, but since no oil pressure is supplied to the oil passage 122, no oil pressure is supplied to the reverse brake B4.

Second Speed

In the second speed, different clutches and brakes are engaged depending on whether the engine brake is operative (the engine brake range position has been selected) or inoperative (the normal forward travel range position has been selected). As shown by the (□) marks in FIG. 3, when the engine brake is operative, the second speed is obtained by engaging the low brake B2, the 2346 brake B3, and the H&LR clutch C3. The second one-way clutch F2 provided parallel to the H&LR clutch C3 also contributes to torque transmission.

When the engine brake is inoperative, the H&LR clutch C3 is disengaged and the low brake B2 and 2346 brake B3 are engaged, and torque is transmitted by the second one-way clutch F2.

In the second speed, the 2346 brake B3 is engaged, and therefore the rotation input into the second ring gear R2 from the input shaft INP is reduced by the second planetary gear G2 alone. This reduced rotation is output to the fourth ring gear R4 from the first connecting member M1. The low brake B2 and the H&LR clutch C3 are engaged (engaged by the second one-way clutch F2 when the engine brake is inoperative), and therefore the rotation input into the fourth ring gear R4 is reduced by the second planetary gear set and output from the third carrier PC3.

In the second speed, torque acts on the 2346 brake B3, the low brake B2, the H&LR clutch C3 (or the second one-way clutch F2), the first connecting member M1, the second connecting member M2, and the third connecting member M3. In other words, the second planetary gear G2 and the second planetary gear set GS2 contribute to torque transmission.

During an upshift from the first speed to the second speed, the first one-way clutch F1 is disengaged at a point where an engagement capacity of the 2346 brake B3 is secured by disengaging the front brake B1 slightly early and then starting to engage the 2346 brake B3. In so doing, an improvement in shift timing precision can be achieved.

At this time, as shown by the solenoid valve operation table in FIG. 4, engagement pressure is supplied to the desired clutches and brakes by switching the first, second, and fifth to seventh solenoid valves SOL1, SOL2, SOL5, SOL6, SOL7 ON and switching the other solenoid valves OFF.

Third Speed

As shown in FIG. 3, the third speed is obtained by engaging the 2346 brake B3, the low brake B2, and the direct clutch C2.

In the third speed, the 2346 brake B3 is engaged, and therefore the rotation input into the second ring gear R2 from the input shaft INP is reduced by the second planetary gear G2. This reduced rotation is output to the fourth ring gear R4 from the first connecting member M1. The direct clutch C2 is engaged, and therefore the fourth planetary gear G4 rotates integrally. The low brake B2 is engaged, and therefore rotation input into the third ring gear R3 from the fourth carrier PC4, which rotates integrally with the fourth ring gear R4, via the second connecting member M2 is reduced by the third planetary gear G3 and output from the third carrier PC3. Hence, the fourth planetary gear G4 contributes to torque transmission but does not contribute to the reduction operation.

In other words, the third speed is defined by a line linking an engagement point of the 2346 brake B3 that reduces the rotation output from the engine and an engagement point of the low brake B2 that reduces the reduced rotation from the second planetary gear G2, and therefore the rotation input from the input shaft INP is reduced and output from the output shaft OUT.

In the third speed, torque acts on the 2346 brake B3, the low brake B2, the direct clutch C2, the first connecting member M1, the second connecting member M2, and the third connecting member M3. In other words, the second planetary gear G2 and the second planetary gear set GS2 contribute to torque transmission.

During an upshift from the second speed to the third speed, the second one-way clutch F2 is disengaged at a point where an engagement capacity of the direct clutch C2 is secured by disengaging the H&LR clutch C3 slightly early and then starting to engage the direct clutch C2. In so doing, an improvement in shift timing precision can be achieved.

At this time, as shown by the solenoid valve operation table in FIG. 4, engagement pressure is supplied to the desired clutches and brakes by switching the first, second, fourth, fifth and seventh solenoid valves SOL1, SOL2, SOL4, SOL5, SOL7 ON and switching the other solenoid valves OFF.

Fourth Speed

As shown in FIG. 3, the fourth speed is obtained by engaging the 2346 brake B3, the direct clutch C2, and the H&LR clutch C3.

In the fourth speed, the 2346 brake B3 is engaged, and therefore the rotation input into the second ring gear R2 from the input shaft INP is reduced by the second planetary gear G2 alone. This reduced rotation is output to the fourth ring gear R4 from the first connecting member M1. The direct clutch C2 and the H&LR clutch C3 are engaged, and therefore the second planetary gear set GS2 rotates integrally. Hence, the rotation input into the fourth ring gear R4 is output from the third carrier PC3 as is.

In the fourth speed, torque acts on the 2346 brake B3, the direct clutch C2, the H&LR clutch C3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired clutches and brakes by switching the second and fifth solenoid valves SOL2, SOL5 ON and switching the other solenoid valves OFF.

Further, since the seventh solenoid valve SOL7 is OFF, the first switch valve SV1 moves to the right of FIG. 2 such that the low brake B2 communicates with a drain circuit and the second pressure regulating valve CV2 communicates with the input clutch C1 (an interlocking condition is prevented). Furthermore, since the D range pressure is exerted on the fourth port c4, the second switch valve SV2 moves to the left in FIG. 2 such that the first port c1 communicates with the third port c3. The sixth pressure regulating valve CV6 moves upward in FIG. 2, and therefore regulated oil pressure is supplied to the fourth switch valve SV4.

The D range pressure acts on the fourth switch valve SV4, and therefore the oil passage 121 communicates with the oil passage 123. The oil passage 122 communicates with the drain circuit, and therefore oil pressure is supplied to the direct clutch C2 but not supplied to the third switch valve SV3. The signal pressure is not supplied to the port d4 from the seventh solenoid valve SOL7, and therefore the third switch valve SV3 moves to the right in FIG. 2. As a result, the second port d2 communicates with the third port d3 but the R range pressure is not supplied to the oil passage 106c (the R range pressure is blocked by the manual valve MV), and therefore no oil pressure is supplied to the reverse brake B4.

Fifth Speed

As shown in FIG. 3, the fifth speed is obtained by engaging the input clutch C1, the direct clutch C2, and the H&LR clutch C3.

In the fifth speed, the input clutch C1 is engaged, and therefore the rotation of the input shaft INP is input into the second connecting member M2. The direct clutch C2 and the H&LR clutch C3 are engaged, and therefore the third planetary gear G3 rotates integrally. Hence, the rotation of the input shaft INP is output from the third carrier PC3 as is.

In the fifth speed, torque acts on the input clutch C1, the direct clutch C2, the H&LR clutch C3, and the second connecting member M2. In other words, only the third planetary gear G3 contributes to torque transmission.

At this time, as shown by the solenoid valve operation table in FIG. 4, engagement pressure is supplied to the desired clutches and brakes by switching all of the solenoid valves SOL1 to SOL7 OFF.

Sixth Speed

As shown in FIG. 3, the sixth speed is obtained by engaging the input clutch C1, the H&LR clutch C3, and the 2346 brake B3.

In the sixth speed, the input clutch C1 is engaged, and therefore the rotation of the input shaft INP is input into the second ring gear and the second connecting member M2. The 2346 brake B3 is engaged, and therefore the rotation reduced by the second planetary gear G2 is output to the fourth ring gear R4 from the first connecting member M1. The H&LR clutch C3 is engaged, and therefore the second planetary gear set GS2 outputs rotation defined by the rotation of the fourth ring gear R4 and the rotation of the second connecting member M2* from the third carrier PC3.

In the sixth speed, torque acts on the input clutch C1, the H&LR clutch C3, the 2346 brake B3, the first connecting member M1, the second connecting member M2, and the third connecting member M3. In other words, the second planetary gear G2 and the second planetary gear set GS2 contribute to torque transmission.

At this time, as shown by the solenoid valve operation table in FIG. 4, engagement pressure is supplied to the desired clutches and brakes by switching the fifth and sixth solenoid valves SOL5, SOL6 ON and switching the other solenoid valves SOL1, SOL2, SOL3, SOL4, SOL7 OFF.

Seventh Speed

As shown in FIG. 3, the seventh speed is obtained by engaging the input clutch C1, the H&LR clutch C3, and the front brake B1 (the one-way clutch F1).

In the seventh speed, the input clutch C1 is engaged, and therefore the rotation of the input shaft INP is input into the second ring gear and the second connecting member M2. The front brake B1 is engaged, and therefore the rotation reduced by the first planetary gear set GS1 is output to the fourth ring gear R4 from the first connecting member M1. The H&LR clutch C3 is engaged, and therefore the second planetary gear set GS2 outputs rotation defined by the rotation of the fourth ring gear R4 and the rotation of the second connecting member M2* from the third carrier PC3.

In the seventh speed, torque acts on the input clutch C1, the H&LR clutch C3, the front brake B1, the first connecting member M1, the second connecting member M2, and the third connecting member M3. In other words, the first planetary gear set GS1 and the second planetary gear set GS2 contribute to torque transmission.

At this time, as shown by the solenoid valve operation table in FIG. 4, engagement pressure is supplied to the desired clutches and brakes by switching the third and sixth solenoid valves SOL3, SOL6 ON and switching the other solenoid valves SOL1, SOL2, SOL4, SOL5, SOL7 OFF.

Reverse

As shown in FIG. 3, reverse is obtained by engaging the H&LR clutch C3, the front brake B1, and the reverse brake B4.

In reverse, the front brake B1 is engaged, and therefore the rotation reduced by the first planetary gear set GS1 is output to the fourth ring gear R4 from the first connecting member M1. The H&LR clutch C3 is engaged and the reverse brake B4 is engaged, and therefore the second planetary gear set GS2 outputs rotation defined by the rotation of the fourth ring gear R4 and a fixed condition of the second connecting member M2 from the third carrier PC3.

In other words, reverse is defined by a line linking respective engagement points of the front brake B1 that reduces the rotation output from the engine via the first planetary gear set GS1, the reverse brake B4 that fixes the rotation of the second connecting member M2, and the H&LR clutch C3 constituting the second planetary gear set GS2, and therefore the rotation input from the input shaft INP is reduced in an opposite direction and output from the output shaft OUT.

As regards the torque flow in reverse, torque acts on the H&LR clutch C3, the front brake B1, the reverse brake B4, the first connecting member M1, the second connecting member M2, and the third connecting member M3. In other words, the first planetary gear set GS1 and second planetary gear set GS2 contribute to torque transmission.

At this time, as shown by the solenoid valve operation table in FIG. 4, engagement pressure is supplied to the desired clutches and brakes by switching the second, third and sixth solenoid valves SOL2, SOL3, SOL6 ON and switching the other solenoid valves SOL1, SOL4, SOL5, SOL7 OFF. The seventh solenoid valve SOL7 is switched ON at the beginning of an R range switch and switched OFF following engagement completion.

The R range pressure is supplied to the reverse brake B4 via the third switch valve SV3. The R range does not have a dedicated pressure regulating valve, and therefore, at the beginning of engagement, the sixth pressure regulating valve CV6 used in the direct clutch C2 is employed to regulate the engagement pressure of the reverse brake B4. When the manual valve MV initially switches to the R range pressure, the second switch valve SV2 moves to the right in FIG. 2 such that the R range pressure is supplied to the sixth pressure regulating valve CV6. The fourth switch valve SV4 moves to the left in FIG. 2 such that the oil passage 121 communicates with the oil passage 122. As a result, oil pressure regulated by the sixth pressure regulating valve CV6 is led into the oil passage 122.

When the seventh solenoid valve SOL7 is switched ON in this state, the third switch valve SV3 moves to the left in FIG. 2 such that the oil passage 122 communicates with an oil passage 130. Hence, while the seventh solenoid valve SOL7 remains ON, the engagement pressure of the reverse brake B4 is controlled by oil pressure regulated by the sixth pressure regulating valve CV6. When engagement is complete, the seventh solenoid valve SOL7 is switched OFF. Accordingly, the third switch valve SV3 moves to the right in FIG. 2 such that the oil passage 106c communicates with the oil passage 130, and as a result, the R range pressure is introduced as is, whereby the engaged condition is maintained.

Hence, by providing the third switch valve SV3 and the fourth switch valve SV4, the engagement pressures of two clutches or brakes can be controlled using a single pressure regulating valve.

Figure 5:
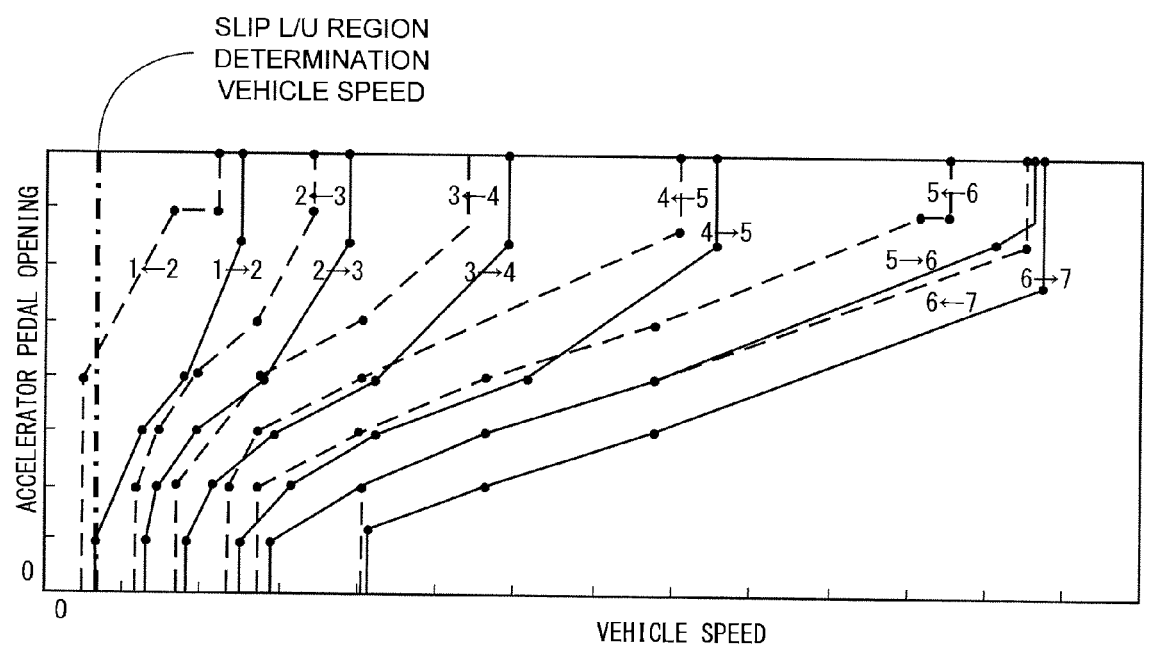
FIG. 5 is an illustrative view of a shift map according to the first embodiment of this invention.

A normal seven speed shift map has the characteristics shown in FIG. 5, for example, wherein shift regions are defined using the vehicle speed Vsp calculated on the basis of the output shaft rotation speed sensor 5 and the accelerator opening APO obtained by the accelerator opening sensor 1 as parameters and an upshift or a downshift is executed when an upshift line or a downshift line is crossed.

Next, lockup control of the torque converter TC in the automatic transmission according to the above embodiment will be described.

The ATCU 20 obtains an operating condition of the vehicle and determines whether to set the lockup clutch LUC of the torque converter TC in an engaged condition or a disengaged condition on the basis of the operating condition. The engagement condition of the lockup clutch LUC of the torque converter TC is then controlled on the basis of the determination result.

More specifically, the ATCU 20 obtains the vehicle speed Vsp as the operating condition. The ATCU 20 compares the vehicle speed Vsp to a lockup region determination vehicle speed (Slip L/U region determination vehicle speed) indicated by a dot-dash line on the shift map in FIG. 5.

When the vehicle speed Vsp is equal to or higher than the Slip L/U region determination vehicle speed, a lockup region is determined, and therefore the ATCU 20 controls the lockup clutch LUC to the engaged condition. When the vehicle speed Vsp is lower than the Slip L/U region determination vehicle speed, a torque converter (T/C) region is determined, and therefore the ATCU 20 controls the lockup clutch LUC to the disengaged condition.

In this embodiment, the engagement condition of the lockup clutch LUC includes slip lockup (also referred to as "Slip L/U" hereafter), in which a difference between an input rotation speed and an output rotation speed of the torque converter TC is controlled to a predetermined range (several tens of rpm, for example).

By executing this control, the engagement condition of the lockup clutch LUC of the torque converter TC is controlled on the basis of the operating condition of the vehicle.

In this embodiment, a determination reference (vehicle speed) at which the lockup clutch LUC is set in the engaged condition and a determination reference (vehicle speed) at which the lockup clutch LUC is set in the disengaged condition are identical, and therefore the engagement region of the lockup clutch LUC is enlarged, leading to an improvement in fuel efficiency.

However, when the determination references for engagement and disengagement are set to be identical, hunting may occur in a case where the operating condition of the vehicle becomes static in the vicinity of the determination reference such that engagement and disengagement of the lockup clutch LUC are switched ON and OFF frequently.

In this embodiment, hunting is suppressed by executing control to be described below.

Figure 6:
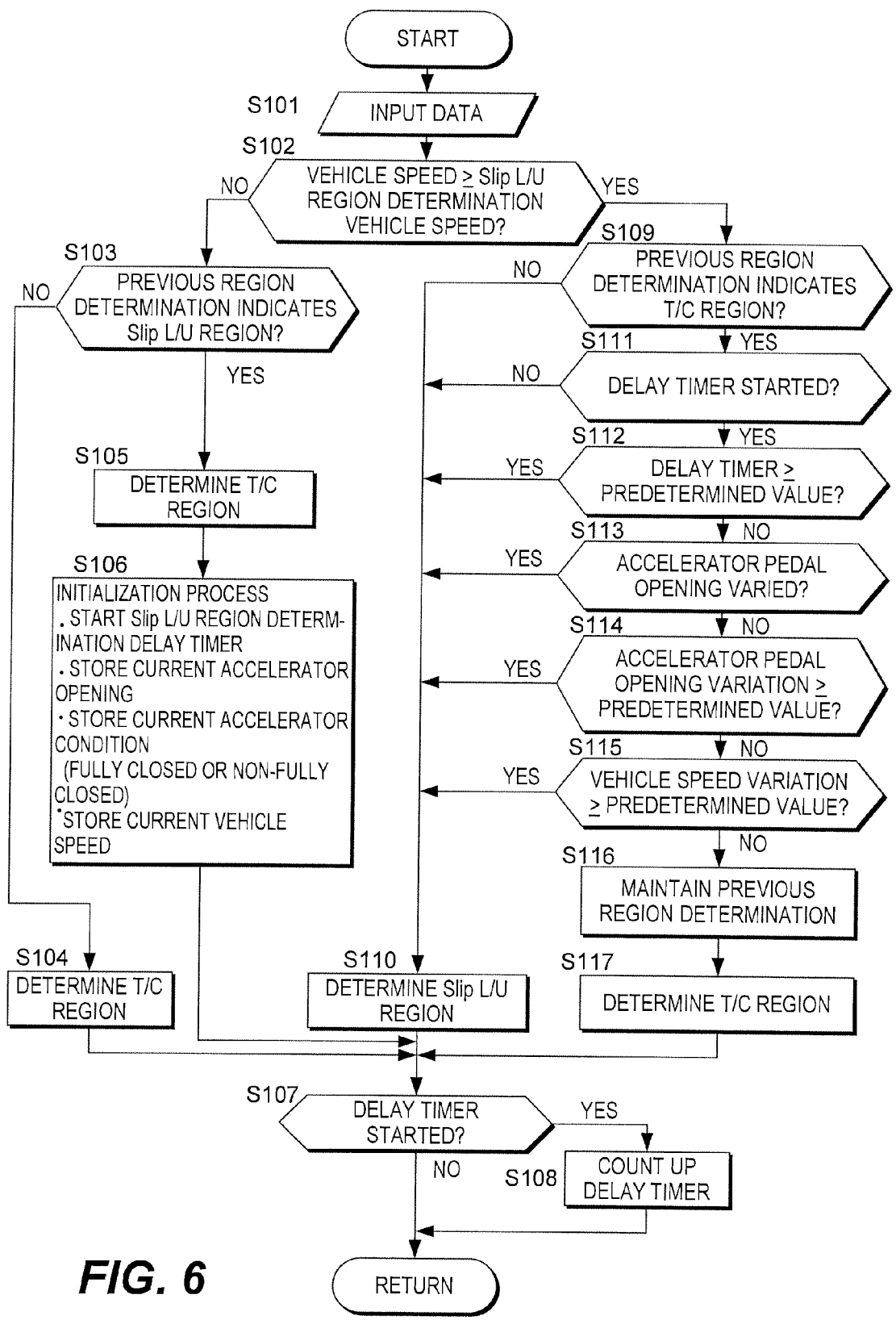
FIG. 6 is a flowchart showing lockup clutch control executed by an ATCU according to the first embodiment of this invention.

FIG. 6 is a flowchart showing control of the lockup clutch LUC executed by the ATCU 20 according to this embodiment.

The flowchart of FIG. 6 is executed by the ATCU 20 at predetermined intervals (every 10 ms, for example).

Following the start of the processing in the flowchart of FIG. 6, the ATCU 20 obtains data relating to current operating conditions of the vehicle (S101). More specifically, the ATCU 20 obtains signals from the first turbine rotation speed sensor 3, the second turbine rotation speed sensor 4, the output shaft rotation speed sensor 5, the inhibitor switch 6, and so on. Further, the accelerator pedal opening APO, the engine rotation speed N, and so on are obtained from the ECU 10.

The ATCU 20 then obtains data (the vehicle speed Vsp, the accelerator pedal opening APO, and so on) relating to the control to be executed on the basis of the signal values obtained from the respective sensors.

Next, the ATCU 20 refers to a pre-stored shift map (FIG. 5) to determine whether or not the obtained vehicle speed Vsp is in the engagement region, or in other words whether or not the vehicle speed Vsp is equal to or higher than the Slip L/U region determination vehicle speed (S102).

When the ATCU 20 determines as a result of the determination that the vehicle speed Vsp is lower than the Slip L/U region determination vehicle speed, the routine advances to a step S103. When the ATCU 20 determines that the vehicle speed Vsp is equal to or higher than the Slip L/U region determination vehicle speed, the routine advances to a step S109.

In the step S103, the ATCU 20 determines whether or not a previous region determination result indicates the Slip L/U region. The previously determined region is a determination result obtained during control (steps S104, S105, S110, S117) executed immediately before the control according to this flowchart.

When the previous determination result does not indicate the Slip L/U region (i.e. indicates the T/C region), the routine advances to a step S104. When the previous determination result indicates the Slip L/U region, the routine advances to a step S105.

In the step S104, the current vehicle speed Vsp is smaller than the Slip L/U region determination vehicle speed and the previous determination result indicates the T/C region, and therefore the ATCU 20 determines that the lockup clutch LUC is to remain in the T/C region.

The routine then advances to a step S107, in which the ATCU 20 determines whether or not a Slip L/U region determination delay timer has already been started. The Slip L/U region determination delay timer is used to measure a time period during which hunting is suppressed following disengagement of the lockup clutch LUC, as will be described below.

When the Slip L/U region determination delay timer has already been started, the ATCU 20 counts up the Slip L/U region determination delay timer by adding 1 thereto, whereby the Slip L/U region determination delay timer is updated (S108). The processing according to this flowchart is then temporarily terminated. When the Slip L/U region determination delay timer has not been started, the processing according to this flowchart is temporarily terminated as is.

When the ATCU 20 determines in the step S103 that the previous determination result indicates the Slip L/U region, the current vehicle speed Vsp is smaller than the Slip L/U region determination vehicle speed, and therefore the ATCU 20 determines that the lockup clutch LUC is in the T/C region in the step S105.

Next, in a step S106, the ATCU 20 executes initialization processing accompanying a shift from the Slip L/U region to the T/C region.

When the lockup clutch LUC is shifted from the Slip L/U region to the T/C region in the step S105 and then immediately returned to the Slip L/U region, hunting occurs.

To prevent this hunting, in this embodiment the lockup clutch LUC is not shifted to the Slip L/U region unless a predetermined condition is established, even if the vehicle speed Vsp is equal to or higher than the Slip L/U region determination vehicle speed. An initial value for determining establishment of the predetermined condition is set in the step S106.

The ATCU 20 then starts the Slip L/U region determination delay timer. Further, the ATCU 20 stores the accelerator pedal opening APO obtained in the step S101, information indicating whether or not the accelerator pedal opening APO is fully closed, and the vehicle speed Vsp.

The routine then advances to a step S107, in which the ATCU 20 determines whether or not the Slip L/U region determination delay timer has already been started. When the routine advances to the step S107 following the processing of the step S106, the Slip L/U region determination delay timer has already been started, and therefore the routine advances to a step S108, in which the ATCU 20 counts up the Slip L/U region determination delay timer. The processing according to this flowchart is then temporarily terminated.

When the ATCU 20 determines in the step S102 that the vehicle speed Vsp is equal to or higher than the Slip L/U region determination vehicle speed, the routine advances to a step S109.

In the step S109, the ATCU 20 determines whether or not the previous region determination result indicates the T/C region. The previously determined region is the determination result obtained during the control executed immediately before the control according to this flowchart.

When the ATCU 20 determines that the previous determination result does not indicate the T/C region, or in other words that the previous determination result indicates the Slip L/U region, the routine advances to a step S110.

In the step S110, the current vehicle speed Vsp is equal to or higher than the Slip L/U region determination vehicle speed and the previous determination result indicates the Slip L/U region, and therefore the ATCU 20 determines that the lockup clutch LUC is to remain in the Slip L/U region.

The routine then advances to the step S107, and when the Slip L/U region determination delay timer has already been started, the ATCU 20 counts up the Slip L/U region determination delay timer (S108). The processing according to this flowchart is then temporarily terminated. When the Slip L/U region determination delay timer has not been started, the processing according to this flowchart is temporarily terminated as is.

When the ATCU 20 determines in the step S109 that the previous determination result indicates the T/C region, the routine advances to a step S111.

In the step S111, the ATCU 20 determines whether or not the Slip L/U region determination delay timer has already been started.

When the Slip L/U region determination delay timer has already been started, the routine advances to a step S112. When the Slip L/U region determination delay timer has not yet been started, the routine advances to the step S110.

The step S111 corresponds to a case in which the previous determination result indicates the T/C region but the vehicle speed Vsp was determined to be equal to or higher than the Slip L/U region determination vehicle speed in the step S102. Here, when the Slip L/U region determination delay timer has already been started, this indicates that the initialization processing of the step S106 was executed, the processing according to this flowchart was temporarily terminated, and then the processing according to this flowchart was restarted.

In this case, a last but one determination result indicates the Slip L/U condition and the previous determination result obtained in the step S105 indicates the T/C condition. Therefore, if the Slip L/U condition is set immediately thereafter on the basis of the vehicle speed Vsp, hunting will occur.

Hence, in this embodiment, the Slip L/U condition is set only when at least one of predetermined conditions defined in steps S112 to S115 is established. When the predetermined condition is not established, the lockup clutch condition is not shifted to the Slip L/U condition even if the vehicle speed Vsp is equal to or greater than the Slip L/U region determination vehicle speed, and instead the T/C condition is maintained.

The predetermined conditions according to this embodiment are that the Slip L/U region determination delay timer has expired (S112), the accelerator pedal opening APO has varied between a fully closed and a non-fully closed condition (S113), the accelerator pedal opening APO has varied by at least a predetermined amount (S114), and the vehicle speed Vsp has varied by at least a predetermined amount (S115). When at least one of these predetermined conditions is established and it is determined accordingly that hunting will not occur, the lockup clutch LUC is shifted to the Slip L/U condition.

In the step S112, the ATCU 20 determines whether or not a value of the Slip L/U region determination delay timer equals or exceeds a predetermined value. When the value of the Slip L/U region determination delay timer equals or exceeds the predetermined value, or in other words when the Slip L/U region determination delay timer has expired, the processing advances to the step S110, in which the Slip L/U condition is set. When the value of the Slip L/U region determination delay timer is smaller than the predetermined value, the processing advances to a step S113.

The Slip L/U region determination delay timer is set as an expiration time such that the timing at which the lockup clutch condition reenters the Slip L/U condition after switching from the Slip L/U condition to the T/C condition is not experienced by the driver as hunting.

In a typical stepped AT, the timing at which a shift is performed following another shift is controlled to or above a predetermined time interval (two seconds, for example) to ensure that the driver does not experience so-called "busy-shift". By setting the predetermined time determined by the Slip L/U region determination delay timer according to this embodiment to be equal to this predetermined time interval, engagement/disengagement switching of the torque converter TC can be controlled such that the driver does not experience this switching as hunting.

In the step S113, the ATCU 20 determines whether or not the condition of the accelerator pedal has varied. More specifically, the ATCU 20 determines whether the condition of the accelerator pedal has varied from a non-fully closed condition to a fully closed condition or from a fully close condition to a non-fully close condition. When the condition of the accelerator pedal is determined to have varied, the processing advances to the step S110, in which the Slip L/U condition is set. When the condition of the accelerator pedal has not varied, the processing advances to a step S114.

The driver controls the speed and acceleration of the vehicle by adjusting the opening of the accelerator pedal. When the driver operates the accelerator pedal intentionally, s/he is able to predict variation in the behavior of the vehicle generated as a result of the operation, and therefore his/her tolerance for hunting is larger than when the pedal is operated unintentionally.

When the ATCU 20 determines in this step S113 that the driver has operated the accelerator pedal intentionally by taking his/her foot off the accelerator pedal or depressing the pedal from a state of release, the tolerance of the driver is large, and therefore, even if the control will cause hunting, the Slip L/U region is set immediately.

Further, a case in which the driver fully closes the accelerator pedal indicates that the driver desires engine braking, and a case in which the driver depresses the accelerator pedal from a fully closed condition indicates that the driver desires acceleration or speed maintenance, and in these cases, the fuel efficiency can be improved by actively setting the lockup clutch in the engaged condition.

In the step S114, the ATCU 20 determines whether or not variation in the accelerator pedal opening APO is equal to or greater than a predetermined amount. The variation in the accelerator pedal opening APO is calculated from an absolute value of a difference between the accelerator pedal opening APO stored in the step S106 of the control executed in the previous flowchart and the accelerator pedal opening APO obtained in the step S101 of the current control.

When the variation in the accelerator pedal opening APO is determined to be equal to or greater than the predetermined amount, the routine advances to the step S110, in which the Slip L/U condition is set. When the variation in the accelerator pedal opening APO is smaller than the predetermined amount, the processing advances to a step S115.

Similarly to the step S114 described above, hunting tolerance is large when the driver operates the accelerator pedal intentionally. Hence, when an operation amount of the accelerator pedal is large, or in other words when variation in the accelerator pedal opening APO is equal to or greater than the predetermined amount (a ⅛ opening, for example), the tolerance of the driver is large, and therefore, even if the control will cause hunting, the Slip L/U region is set.

A case in which variation in the accelerator pedal opening APO is large indicates that the driver actively intends to accelerate or decelerate, and in this case the fuel efficiency can be improved by actively setting the lockup clutch in the engaged condition.

In the step S115, the ATCU 20 determines whether or not variation in the vehicle speed Vsp is equal to or greater than a predetermined amount. The variation in the vehicle speed Vsp is calculated from an absolute value of a difference between the vehicle speed Vsp stored in the step S106 of the control executed in the previous flowchart and the vehicle speed Vsp obtained in the step S101 of the current control.

When the variation in the vehicle speed Vsp is determined to be equal to or greater than the predetermined amount, the routine advances to the step S110, in which the Slip L/U condition is set. When the variation in the vehicle speed Vsp is smaller than the predetermined amount, the processing advances to a step S116.

Variation in the vehicle speed Vsp results from an intention of the driver to accelerate or decelerate. Hence, when the driver actively intends to accelerate or decelerate, his/her tolerance for hunting is large. Therefore, when the variation in the vehicle speed Vsp is large, or more specifically equal to or larger than the predetermined amount, the tolerance of the driver is large, and therefore, even if the control will cause hunting, the Slip L/U region is set.

A comparative art example, hysteresis is set between engagement/disengagement determination values of the lockup clutch LCU in order to prevent hunting. Hysteresis is also set in relation to gear position modification in a conventional stepped transmission. In this case, the hysteresis is normally set at approximately 3 km/h. By setting the predetermined value for determining that the variation in the vehicle speed Vsp is large according to this embodiment to be equal to the hysteresis in the aforementioned case, engagement/disengagement switching of the torque converter TC can be controlled such that the driver does not experience this switching as hunting.

When the ATCU 20 determines that none of the predetermined conditions defined in the control of the steps S112 to S115 is established, the processing advances to the step S116, in which the ATCU 20 decides to maintain the previous region determination result. Hence, the ATCU 20 determines in a step S117 that the lockup clutch LUC is in the T/C region.

The processing then advances to the step S107, and when the Slip L/U region determination delay timer has already been started, the ATCU 20 counts up the Slip L/U region determination delay timer (S108). The processing according to this flowchart is then temporarily terminated. When the Slip L/U region determination delay timer has not been started, the processing according to this flowchart is terminated as is.

Hence, with the control according to this flowchart, an improvement in fuel efficiency can be achieved by not inserting hysteresis into the engagement/disengagement switching operations of the lockup clutch LUC in the torque converter TC, and moreover, the unpleasant sensation experienced by the driver due to hunting can be reduced.

Figure 7:
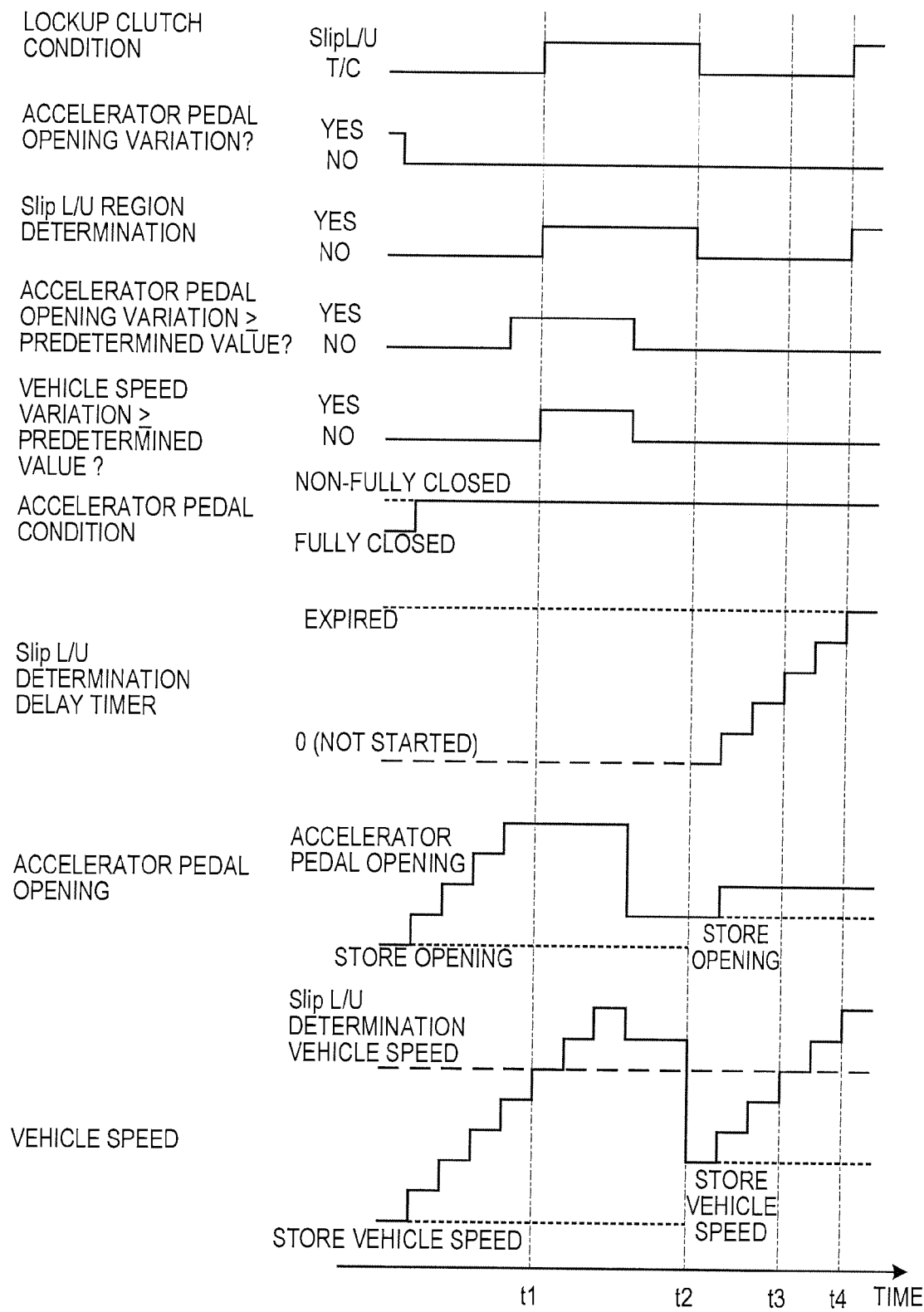
FIG. 7 is a time chart showing the lockup clutch control executed by the ATCU according to the first embodiment of this invention.

FIG. 7 is a time chart showing the control performed on the lockup clutch LUC by the ATCU 20 according to this embodiment.

The time chart in FIG. 7 shows, in descending order, the condition of the lockup clutch LUC, variation in the accelerator pedal opening APO, the result of the comparison between the variation in the accelerator pedal opening APO and the predetermined value, the result of the comparison between the variation in the vehicle speed Vsp and the predetermined value, the accelerator pedal condition, the condition of the Slip L/U region determination delay timer, variation in the accelerator pedal opening APO, and variation in the vehicle speed Vsp.

In the initial condition, the condition (command value) of the lockup clutch LUC corresponds to the T/C condition.

When the vehicle speed Vsp rises such that the ATCU 20 determines at a timing t1 that the vehicle speed Vsp is equal to or higher than the Slip L/U region determination vehicle speed ("YES" in the step S102 of FIG. 6), the ATCU 20 determines that the previous region determination indicates T/C ("YES" in the step S109) and that the Slip L/U region determination delay timer has not yet been started ("NO" in the step S111), and therefore the processing advances to the step S110, in which the Slip L/U condition is determined.

When the vehicle speed Vsp then falls such that the ATCU 20 determines at a timing t2 that the vehicle speed Vsp is lower than the Slip L/U region determination vehicle speed ("NO" in the step S102 of FIG. 6), the ATCU 20 determines that the previous region determination indicates Slip L/U ("YES" in the step S103), and therefore the processing advances to the step S105, in which the T/C condition is determined.

Next, the ATCU 20 executes the initialization control of the step S106, whereby the Slip L/U region determination delay timer is started. The ATCU 20 then stores the accelerator pedal condition, the accelerator pedal opening APO, and the vehicle speed Vsp at the timing t2.

When the vehicle speed Vsp rises again such that the ATCU 20 determines at a timing t3 that the vehicle speed Vsp is equal to or higher than the Slip L/U region determination vehicle speed ("YES" in the step S102), the ATCU 20 determines that the previous region determination indicates T/C ("YES" in the step S109) and that the Slip L/U region determination delay timer has already been started ("YES" in the step S111), and therefore the ATCU 20 determines whether or not the predetermined conditions defined in the steps S112 to S115 of FIG. 6 are established.

In the step S112 of FIG. 6, the ATCU 20 determines whether or not the Slip L/U region determination delay timer has expired. At the timing t3, the Slip L/U region determination delay timer has not yet expired, and therefore this condition is not established.

In the step S113 of FIG. 6, the ATCU 20 determines whether or not the condition of the accelerator pedal has varied to the fully closed condition. At the timing t3, the condition of the accelerator pedal has not varied, and therefore this condition is not established.

In the step S114 of FIG. 6, the ATCU 20 determines whether or not the variation in the accelerator pedal opening APO is equal to or greater than the predetermined value. At the timing t3, the variation in the accelerator pedal opening APO is smaller than the predetermined value, and therefore this condition is not established.

In the step S115 of FIG. 6, the ATCU 20 determines whether or not the variation in the vehicle speed Vsp is equal to or greater than the predetermined value. At the timing t3, the variation in the vehicle speed Vsp is smaller than the predetermined value, and therefore this condition is not established.

Hence, at the timing t3, none of the predetermined conditions is established, and therefore the ATCU 20 maintains the T/C region even though the vehicle speed Vsp is equal to or greater than the Slip L/U region determination vehicle speed.

When subsequently the vehicle speed Vsp equals or exceeds the Slip L/U region determination vehicle speed ("YES" in the step S102 of FIG. 6), the previous region determination indicates T/C ("YES" in the step S109 of FIG. 6), and the Slip L/U region determination delay timer has already been started ("YES" in the step S111 in FIG. 6), the ATCU 20 repeats the determination as to whether or not the predetermined conditions defined in the steps S112 to S115 of FIG. 6 are established. During this repetition, the Slip L/U region determination delay timer is counted up through the processing of the steps S107 and S108 in FIG. 6.

When the ATCU 20 determines that at least one of the predetermined conditions defined in the steps S112 to S115 of FIG. 6 is established at a timing t4 (here, the Slip L/U region determination delay timer expires such that an affirmative determination is obtained in the step S112 of FIG. 6), the processing advances to the step S110, in which the lockup clutch LUC is shifted to the Slip L/U region.

Hence, when the lockup clutch LUC shifts from the Slip L/U condition to the T/C condition and then returns to the Slip L/U condition, the ATCU 20 executes control to ensure that the driver does not sense hunting.

In the first embodiment of this invention, as described above, the reference value for determining that the lockup clutch LUC of the torque converter TC is to be set in the engaged condition (Slip L/U) and the reference value for determining that the lockup clutch LUC is to be set in the disengaged condition (T/C) are identical, and no hysteresis is set therein. In so doing, the region in which the lockup clutch LUC is engaged can be enlarged, enabling an improvement in fuel efficiency.

Further, when the lockup clutch LUC varies from the engaged condition to the disengaged condition, the ATCU 20 stores the vehicle conditions (the condition of the accelerator pedal, the accelerator pedal opening APO and the vehicle speed Vsp), and when the reference value subsequently enters an engagement region, the ATCU 20 compares the stored vehicle conditions with the current vehicle conditions and returns the lockup clutch LUC to the engaged condition only when a predetermined condition is established. In so doing, the unpleasant sensation experienced by the driver due to control hunting occurring when the lockup clutch LUC is switched repeatedly between the engaged condition and the disengaged condition can be reduced.

Second Embodiment

Next, a second embodiment will be described.

In the first embodiment, after the lockup clutch LUC is set in the disengaged condition from the engaged condition, re-engagement is permitted only when the predetermined condition is established. In the second embodiment, on the other hand, vehicle acceleration is detected and the engagement condition is controlled on the basis of the detected acceleration.

The basic constitution of the second embodiment is identical to that of the first embodiment, and therefore description thereof has been omitted.

Figure 8:
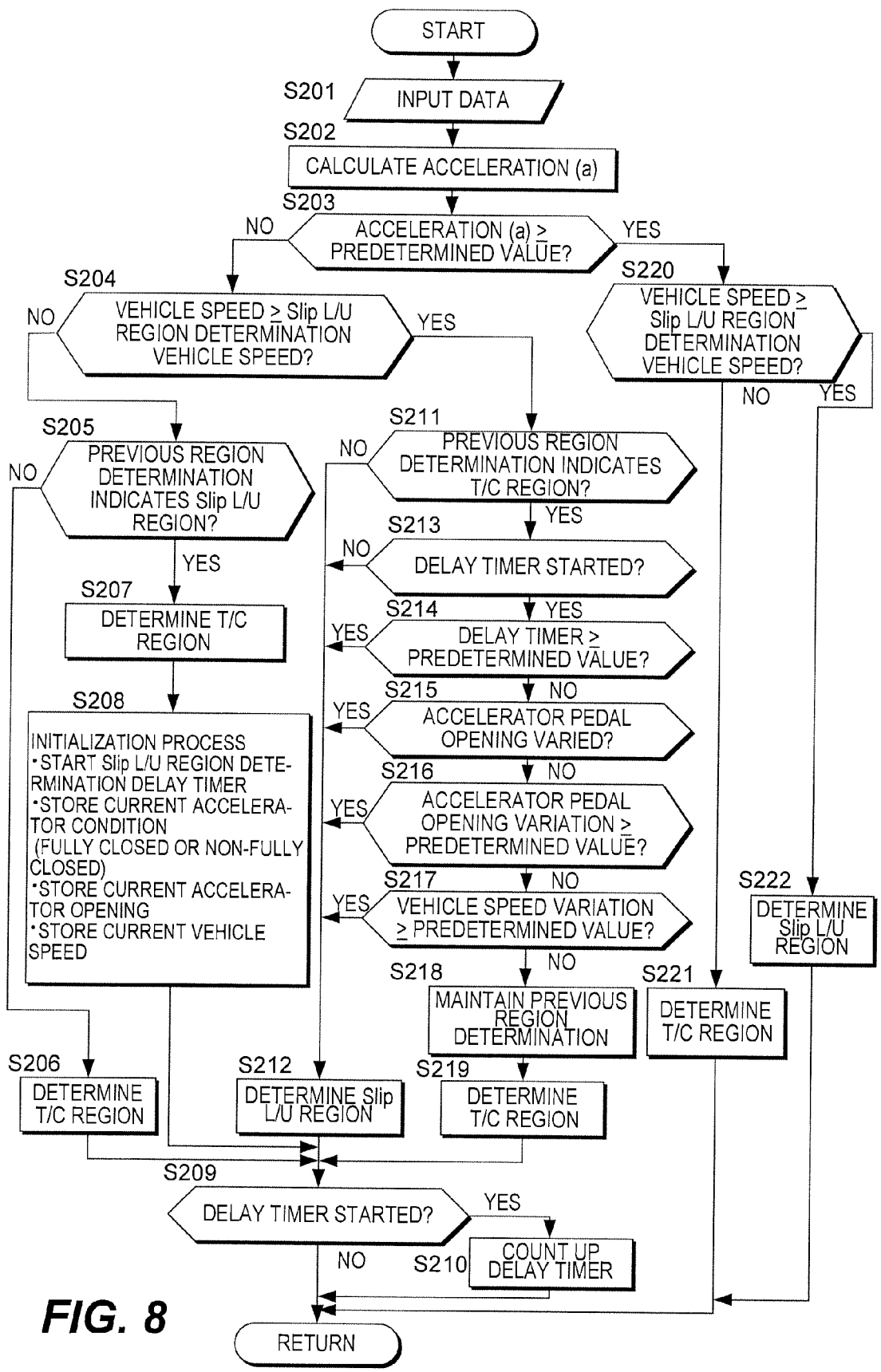
FIG. 8 is a flowchart showing lockup clutch control executed by an ATCU according to a second embodiment of this invention.

FIG. 8 is a flowchart showing control of the lockup clutch LUC executed by the ATCU 20 according to the second embodiment of this invention.

Similarly to the first embodiment, the flowchart in FIG. 8 is executed by the ATCU 20 at predetermined intervals (every 10 ms, for example).

Following the start of the processing in the flowchart of FIG. 8, the ATCU 20 obtains data relating to the current operating conditions of the vehicle (the vehicle speed Vsp, the accelerator pedal opening APO, the rotation speeds of the respective rotation speed sensors, and so on) (S201).

On the basis of signal values from the respective sensors, the ATCU 20 calculates a current vehicle acceleration (a) (S202).

The ATCU 20 then determines whether or not the calculated acceleration (a) is equal to or greater than a predetermined value. When the acceleration (a) is determined to be equal to or greater than the predetermined value, the processing advances to a step S220, and when the acceleration (a) is determined to be smaller than the predetermined value, the processing advances to a step S204.

In the first embodiment, as described above, when the driver operates the accelerator pedal intentionally to adjust the speed and acceleration, s/he is able to predict variation in the behavior of the vehicle generated as a result of the adjustment, and therefore his/her tolerance for hunting is larger than when the pedal is operated unintentionally.

In the second embodiment, if acceleration generated as a result of this type of operation by the driver is determined to be sufficiently large, the determination relating to establishment of the predetermined conditions is not made, and instead, the engagement determination relating to the lockup clutch LUC is made on the basis of the vehicle speed alone.

More specifically, when the ATCU 20 determines in a step S203 that the vehicle acceleration (a) is equal to or greater than a predetermined value, the processing advances to the step S220, in which a determination is made as to whether or not the vehicle speed Vsp is equal to or higher than the Slip L/U region determination vehicle speed.

In a typical traveling condition focusing heavily on fuel efficiency, acceleration at the time of startup is 0.1 G (G=0.9 m/s$^2$). Therefore, the determination as to whether or not acceleration is sufficiently large can be made by setting the predetermined value of the acceleration (a) at 0.1 G.

When it is determined that the vehicle speed Vsp is lower than the Slip L/U region determination vehicle speed, the processing advances to a step S221, in which the ATCU 20 determines the T/C region. When the ATCU 20 determines that the vehicle speed Vsp is equal to or higher than the Slip L/U region determination vehicle speed, the processing advances to a step S222, in which the ATCU 20 determines the Slip L/U region.

The control according to this flowchart is then temporarily terminated.

When the ATCU 20 determines in the step S203 that the vehicle acceleration (a) is smaller than the predetermined value, the processing advances to the step S204. Control executed in steps S204 to S219 is identical to that of the first embodiment, and therefore description thereof has been omitted.

Figure 9:
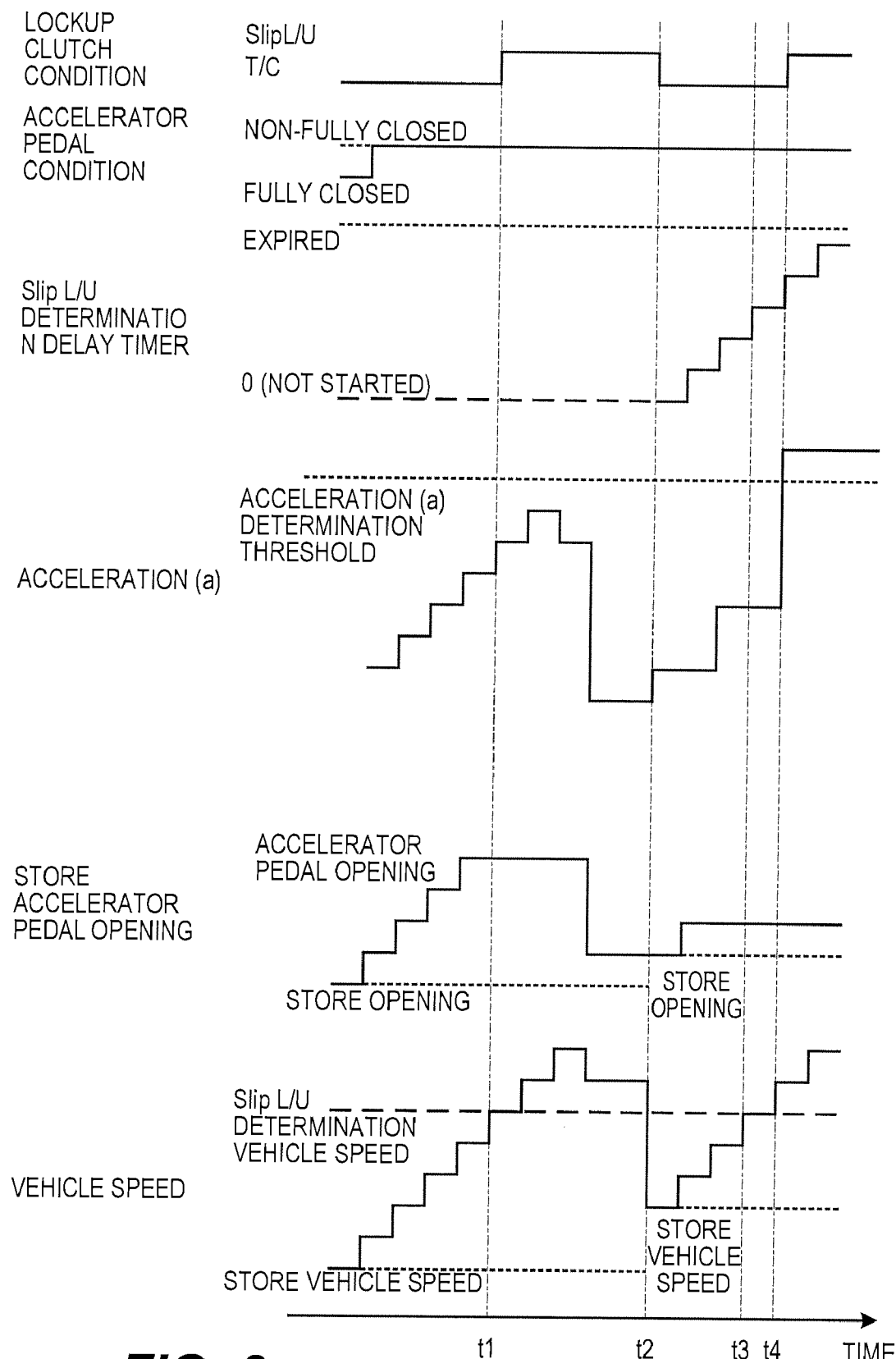
FIG. 9 is a time chart showing the lockup clutch control executed by the ATCU according to the second embodiment of this invention.

FIG. 9 is a time chart showing the control performed on the lockup clutch LUC by the ATCU 20 in the second embodiment.

The time chart in FIG. 9 shows, in descending order, the condition of the lockup clutch LUC, the condition of the accelerator pedal, the condition of the Slip L/U region determination delay timer, the condition of the acceleration (a), variation in the accelerator pedal opening APO, and variation in the vehicle speed Vsp.

In the initial condition, the condition (command value) of the lockup clutch LUC corresponds to the T/C condition.

When the vehicle speed Vsp rises such that the ATCU 20 determines at a timing t1 that the acceleration (a) is smaller than the predetermined value ("NO" in the step S203 of FIG. 8) and the vehicle speed Vsp is equal to or higher than the Slip L/U region determination vehicle speed ("YES" in the step S204 of FIG. 8), the ATCU 20 determines that the previous region determination indicates T/C ("YES" in a step S211 of FIG. 8) and that the Slip L/U region determination delay timer has not yet been started ("NO" in a step S213 of FIG. 8), and therefore the processing advances to a step S212, in which the Slip L/U condition is determined.

When the vehicle speed Vsp then falls such that the ATCU 20 determines at a timing t2 that the acceleration (a) is smaller than the predetermined value ("NO" in the step S203 of FIG. 8) and the vehicle speed Vsp is lower than the Slip L/U region determination vehicle speed ("NO" in the step S204), the ATCU 20 determines that the previous region determination indicates Slip L/U ("YES" in the step S205 of FIG. 8), and therefore the processing advances to a step S207, in which the T/C condition is determined.

The ATCU 20 then executes initialization control in a step S208.

When the vehicle speed Vsp rises again such that the ATCU 20 determines at a timing t3 that the acceleration (a) is smaller than the predetermined value ("NO" in the step S203 of FIG. 8) and the vehicle speed Vsp is equal to or greater than the Slip L/U region determination vehicle speed ("YES" in the step S204 of FIG. 8), the ATCU 20 determines that the previous region determination indicates T/C ("YES" in the step S211 of FIG. 8) and that the Slip L/U region determination delay timer has already been started ("YES" in the step S213 of FIG. 8), and therefore the ATCU 20 determines whether or not predetermined conditions defined in steps S214 to S217 of FIG. 8 are established.

In the example shown in FIG. 9, the predetermined conditions are not established at the timing t3, and therefore the ATCU 20 maintains the T/C region even though the vehicle speed Vsp is equal to or higher than the Slip L/U region determination vehicle speed.

When the ATCU 20 determines at a timing t4 that the acceleration (a) is equal to or greater than the predetermined value ("YES" in the step S203 of FIG. 8), the engagement determination relating to the lockup clutch LUC is made only on the basis of whether or not the vehicle speed Vsp is equal to or higher than the Slip L/U region determination vehicle speed.

When the ATCU 20 determines that the vehicle speed Vsp is equal to or higher than the Slip L/U region determination vehicle speed ("YES" in the step S220 of FIG. 8), the processing advances to the step S222, in which the lockup clutch LUC is shifted to the Slip L/U region.

By employing the magnitude of the acceleration (a) in the determination when the lockup clutch LUC shifts from the Slip L/U condition to the T/C condition and then returns to the Slip L/U condition, control is performed such that an improvement in fuel efficiency is achieved without causing the driver to sense hunting.

Hence, in the second embodiment of this invention, in addition to the first embodiment described above, acceleration is used to determine engagement/disengagement of the lockup clutch LUC of the torque converter TC. With this constitution, in addition to the effects of the first embodiment, when the vehicle acceleration is sufficiently large, the determination is made using only the vehicle speed, i.e. without determining whether or not the predetermined conditions are established, and therefore an enlargement in the engagement region can be achieved while improving the fuel efficiency and reducing hunting.

In particular, when the acceleration is sufficiently large, the operating condition does not become static in the vicinity of a fixed vehicle speed, and therefore hunting is unlikely to occur. Accordingly, hunting prevention control does not have to be executed in this operating condition. Hence, by not performing the determination relating to the predetermined conditions when the acceleration is sufficiently large, a control delay can be prevented such that the lockup clutch LUC can be shifted to the engaged condition more quickly, and as a result, an improvement in fuel efficiency can be achieved.

It should be noted that in the first and second embodiments, a seven speed automatic transmission was described as an example, but this invention is not limited thereto and may be applied to another stepped transmission. This invention may also be applied to a belt type continuously variable transmission in which a belt, a chain, or similar is sandwiched between pulleys, or a toroidal (full toroidal/half toroidal) continuously variable speed change mechanism in which a power roller is sandwiched between input/output disks.

This invention is not limited to the embodiment described above, and naturally includes various modifications and improvements within the scope of the technical spirit thereof.

This application claims priority from Japanese Patent Application No. 2009-202329 filed Sep. 2, 2009, which is incorporated herein by reference.

What is claimed is:

1. A control device for an automatic transmission having a torque converter, in which a target gear position is set on the basis of a vehicle speed and an engine load comprising:
    a vehicle speed detecting unit that detects the vehicle speed;
    a storing unit that stores a determination reference used to determine whether to set a friction element for locking up the torque converter in an engaged condition or a disengaged condition;
    a determining unit that determines that the friction element is to be set in the engaged condition in case the vehicle speed is equal to or higher than the determination reference and determining that the friction element is to be set in the disengaged condition in case the vehicle speed is lower than the determination reference; and
    an engagement control unit performs control to engage or disengage the friction element on the basis of a determination result of the determining unit,
    wherein the engagement control unit comprise a prohibiting unit that prohibits setting of the friction element in the engaged condition until a predetermined condition is established, regardless of the determination result, after the friction element is controlled from the engaged condition to the disengaged condition.

2. The control device for an automatic transmission as defined in claim 1, wherein the engagement control unit determines that the predetermined condition is established in case a predetermined time elapses after the friction element is controlled to the disengaged condition from the engaged condition.

3. The control device for an automatic transmission as defined in claim 1, wherein the engagement control unit determines that the predetermined condition is established in case an accelerator pedal opening switches from a non-fully closed condition to a fully closed condition or from a fully closed condition to a non-fully closed condition after the friction element is controlled to the disengaged condition from the engaged condition.

4. The control device for an automatic transmission as defined in claim 1, wherein the engagement control unit determines that the predetermined condition is established in case the accelerator pedal opening varies by at least a predetermined opening after the friction element is controlled to the disengaged condition from the engaged condition.

5. The control device for an automatic transmission as defined in claim 1, wherein the engagement control unit determines that the predetermined condition is established in case the vehicle speed varies by at least a predetermined vehicle speed after the friction element is controlled to the disengaged condition from the engaged condition.

6. The control device for an automatic transmission as defined in claim 1, further comprising a acceleration detecting unit that detects an acceleration of the vehicle,
wherein, in case the detected acceleration is equal to or greater than a predetermined acceleration, the engagement control unit allows the friction element to be set in the engaged condition on the basis of the determination result without having the prohibiting unit determines whether or not the predetermined condition is established.

7. A control method for an automatic transmission having a torque converter, in which a target gear position is set on the basis of a vehicle speed and an engine load, comprising:
a detecting step for detecting the vehicle speed;
a storing step for storing a determination reference used to determine whether to set a friction element for locking up the torque converter in an engaged condition or a disengaged condition;
a determining step for determining that the friction element is to be set in the engaged condition in case the vehicle speed is equal to or higher than the determination reference and determining that the friction element is to be set in the disengaged condition in case the vehicle speed is lower than the determination reference; and
an engagement control step for performing control to engage or disengage the friction element on the basis of a determination result of the determining step,
wherein the engagement control step comprise a prohibiting step for prohibiting setting of the friction element in the engaged condition until a predetermined condition is established, regardless of the determination result, after the friction element is controlled from the engaged condition to the disengaged condition.

8. The control method for an automatic transmission as defined in claim 7, wherein the engagement control step determine that the predetermined condition is established in case a predetermined time elapses after the friction element is controlled to the disengaged condition from the engaged condition.

9. The control method for an automatic transmission as defined in claim 7, wherein the engagement control step determine that the predetermined condition is established in case an accelerator pedal opening switches from a non-fully closed condition to a fully closed condition or from a fully closed condition to a non-fully closed condition after the friction element is controlled to the disengaged condition from the engaged condition.

10. The control method for an automatic transmission as defined in claim 7, wherein the engagement control step determine that the predetermined condition is established in case the accelerator pedal opening varies by at least a predetermined opening after the friction element is controlled to the disengaged condition from the engaged condition.

11. The control method for an automatic transmission as defined in claim 7, wherein the engagement control step determine that the predetermined condition is established in case the vehicle speed varies by at least a predetermined vehicle speed after the friction element is controlled to the disengaged condition from the engaged condition.

12. The control method for an automatic transmission as defined in claim 7, further comprising an acceleration detecting step for detecting an acceleration of the vehicle,
wherein, in case the detected acceleration is equal to or greater than a predetermined acceleration, the engagement control step allow the friction element to be set in the engaged condition on the basis of the determination result without having the prohibiting step determine whether or not the predetermined condition is established.

13. A control device for an automatic transmission having a torque converter, in which a target gear position is set on the basis of a vehicle speed and an engine load, comprising:
vehicle speed detecting means for detecting the vehicle speed;
storing means for storing a determination reference used to determine whether to set a friction element for locking up the torque converter in an engaged condition or a disengaged condition;
determining means for determining that the friction element is to be set in the engaged condition in case the vehicle speed is equal to or higher than the determination reference and determining that the friction element is to be set in the disengaged condition in case the vehicle speed is lower than the determination reference; and
engagement control means for performing control to engage or disengage the friction element on the basis of a determination result of the determining means,
wherein the engagement control means comprise prohibiting means for prohibiting setting of the friction element in the engaged condition until a predetermined condition is established, regardless of the determination result, after the friction element is controlled from the engaged condition to the disengaged condition.

14. The control device for an automatic transmission as defined in claim 13, wherein the engagement control means determine that the predetermined condition is established in case a predetermined time elapses after the friction element is controlled to the disengaged condition from the engaged condition.

15. The control device for an automatic transmission as defined in claim 13, wherein the engagement control means determine that the predetermined condition is established in case an accelerator pedal opening switches from a non-fully closed condition to a fully closed condition or from a fully closed condition to a non-fully closed condition after the friction element is controlled to the disengaged condition from the engaged condition.

16. The control device for an automatic transmission as defined in claim 13, wherein the engagement control means determine that the predetermined condition is established in case the accelerator pedal opening varies by at least a predetermined opening after the friction element is controlled to the disengaged condition from the engaged condition.

17. The control device for an automatic transmission as defined in claim 13, wherein the engagement control means determine that the predetermined condition is established in case the vehicle speed varies by at least a predetermined vehicle speed after the friction element is controlled to the disengaged condition from the engaged condition.

18. The control device for an automatic transmission as defined in claim 13, further comprising acceleration detecting means for detecting an acceleration of the vehicle, wherein, in case the detected acceleration is equal to or greater than a predetermined acceleration, the engagement control means allow the friction element to be set in the engaged condition on the basis of the determination result without having the prohibiting means determine whether or not the predetermined condition is established.

* * * * *